United States Patent
Lee et al.

(10) Patent No.: US 8,320,918 B2
(45) Date of Patent: Nov. 27, 2012

(54) METHOD FOR RESELECTING A CELL AND DETECTING WHETHER A TERMINAL IS STATIONARY IN MOBILE TELECOMMUNICATIONS SYSTEM

(75) Inventors: Seon-Don Lee, Gyeonggi-Do (KR);
Sung-Duck Chun, Gyeonggi-Do (KR);
Seung-June Yi, Gyeonggi-Do (KR);
Young-Dae Lee, Gyeonggi-Do (KR);
Sung-Jun Park, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 186 days.

(21) Appl. No.: 12/680,422

(22) PCT Filed: Sep. 27, 2008

(86) PCT No.: PCT/KR2008/005727
§ 371 (c)(1),
(2), (4) Date: Apr. 8, 2010

(87) PCT Pub. No.: WO2009/041791
PCT Pub. Date: Apr. 2, 2009

(65) Prior Publication Data
US 2010/0240356 A1    Sep. 23, 2010

Related U.S. Application Data

(60) Provisional application No. 60/975,819, filed on Sep. 28, 2007, provisional application No. 60/983,866, filed on Oct. 30, 2007, provisional application No. 61/018,898, filed on Jan. 4, 2008, provisional application No. 61/019,575, filed on Jan. 7, 2008, provisional application No. 61/007,271, filed on Dec. 11, 2007.

(30) Foreign Application Priority Data

Sep. 26, 2008 (KR) .................. 10-2008-0094998

(51) Int. Cl.
*H04W 36/00* (2009.01)
(52) U.S. Cl. .................. 455/441; 455/435.1; 455/435.2; 455/436; 455/437; 455/440
(58) Field of Classification Search ........... 455/436–441
See application file for complete search history.

(56) References Cited

U.S. PATENT DOCUMENTS
6,388,997 B1  5/2002  Scott
(Continued)

FOREIGN PATENT DOCUMENTS
JP  2000-151694 A  5/2000
(Continued)

OTHER PUBLICATIONS

3GPP TS 25.402 V7.5.0, "Technical Specification Group Radio Access Network; Synchronisation in UTRAN Stage 2 (Release 7)", 3rd Generation Partnership Project, Dec. 2007.
(Continued)

*Primary Examiner* — Olumide T Ajibade Akonai
*Assistant Examiner* — Jaime Holliday
(74) *Attorney, Agent, or Firm* — Birch, Stewart, Kolasch & Birch, LLP

(57) ABSTRACT

Disclosed is a method for determining, by a terminal, its mobility and deciding a time to select another cell in a mobile communication system, in which the terminal determines the mobility by using variation information in signal characteristic values of measurable specific cells, thereby appropriately controlling a size of a time restriction (e.g., Treselection) for a cell re-selection and preventing frequent occurrence of cell selection such as a ping-pong situation, thus to reduce an unnecessary service delay due to the cell re-selection and maximize a service quality for a user.

8 Claims, 10 Drawing Sheets

U.S. PATENT DOCUMENTS

| | | |
|---|---|---|
| 6,421,334 B1 | 7/2002 | Baines |
| 6,434,389 B1 | 8/2002 | Meskanen et al. |
| 7,209,747 B2 | 4/2007 | Chen |
| 8,131,295 B2 | 3/2012 | Wang et al. |
| 2001/0021661 A1 | 9/2001 | Pautonnier |
| 2002/0126629 A1 | 9/2002 | Jiang et al. |
| 2003/0224790 A1 | 12/2003 | Choi |
| 2004/0162074 A1 | 8/2004 | Chen |
| 2004/0203778 A1 | 10/2004 | Kuo et al. |
| 2004/0208142 A1 | 10/2004 | Saw |
| 2005/0026597 A1 | 2/2005 | Kim et al. |
| 2005/0220042 A1 | 10/2005 | Chang et al. |
| 2005/0287957 A1 | 12/2005 | Lee et al. |
| 2006/0035662 A1 | 2/2006 | Jeong et al. |
| 2006/0056347 A1 | 3/2006 | Kwak et al. |
| 2006/0104225 A1 | 5/2006 | Kim et al. |
| 2006/0116136 A1 | 6/2006 | Noma |
| 2006/0251023 A1 | 11/2006 | Choi |
| 2007/0047547 A1 | 3/2007 | Conner et al. |
| 2007/0049325 A1 | 3/2007 | Lee |
| 2007/0115894 A1 | 5/2007 | Herrmann et al. |
| 2007/0201424 A1 | 8/2007 | Kobayashi et al. |
| 2007/0202892 A1 | 8/2007 | Voyer |
| 2007/0250751 A1 | 10/2007 | Cai et al. |
| 2007/0253393 A1 | 11/2007 | Tseng |
| 2008/0005638 A1 | 1/2008 | Kuo et al. |
| 2008/0043771 A1 | 2/2008 | Cho et al. |
| 2008/0119209 A1* | 5/2008 | Upp ........................... 455/458 |
| 2008/0188247 A1 | 8/2008 | Worrall |
| 2008/0205433 A1 | 8/2008 | Pihlaja et al. |
| 2008/0220784 A1* | 9/2008 | Somasundaram et al. .... 455/437 |
| 2008/0233941 A1 | 9/2008 | Jen |
| 2008/0268843 A1 | 10/2008 | Ore et al. |
| 2008/0318578 A1 | 12/2008 | Worrall |
| 2009/0041240 A1 | 2/2009 | Parkvall et al. |
| 2009/0086853 A1 | 4/2009 | Ye |
| 2009/0088160 A1 | 4/2009 | Pani et al. |
| 2009/0111445 A1 | 4/2009 | Ratasuk et al. |
| 2009/0247211 A1 | 10/2009 | Kuroda |
| 2009/0318175 A1 | 12/2009 | Sandberg |
| 2010/0091721 A1 | 4/2010 | Larmo et al. |
| 2010/0093386 A1 | 4/2010 | Damnjanovic et al. |
| 2010/0178923 A1 | 7/2010 | Yi et al. |
| 2010/0232301 A1* | 9/2010 | Omori ........................... 370/252 |
| 2010/0284376 A1 | 11/2010 | Park et al. |
| 2010/0290427 A1 | 11/2010 | Sebire et al. |
| 2011/0268234 A1 | 11/2011 | Khandekar et al. |

FOREIGN PATENT DOCUMENTS

| | | |
|---|---|---|
| JP | 2002-268697 A | 9/2002 |
| JP | 2003-87317 A | 3/2003 |
| JP | 2004-349882 A | 12/2004 |
| JP | 2005-530463 A | 10/2005 |
| JP | 2006-506892 A | 2/2006 |
| KR | 10-2004-0008100 A | 1/2004 |
| KR | 10-2004-0008228 A | 1/2004 |
| KR | 10-2005-0014684 | 2/2005 |
| KR | 10-2005-0028254 A | 3/2005 |
| KR | 10-2006-0024756 A | 3/2006 |
| KR | 10-2007-0080188 A | 8/2007 |
| KR | 10-2007-0120453 A | 12/2007 |
| WO | WO 03/027860 A1 | 4/2003 |
| WO | WO 2004/004163 A1 | 1/2004 |
| WO | WO 2005/091668 A1 | 9/2005 |
| WO | WO 2005/122441 A1 | 12/2005 |
| WO | WO 2006/035501 A1 | 4/2006 |
| WO | WO 2006/096036 A1 | 9/2006 |
| WO | WO 2006/118426 A1 | 11/2006 |
| WO | WO 2006/118738 A1 | 11/2006 |

OTHER PUBLICATIONS

R2-074504, "Change Request", 3GPP TSG-RAN2 Meeting #59bis, Oct. 2007.

Nokia Siemens Networks, Nokia; "CS Over HSDPA"; 3GPP TSG-RAN WG2 Meeting #59bis; Shanghai, China; Oct. 12, 2007; pp. 1-20.

Nokia Siemens Networks, Nokia; "CS Over HSPA Impact to Specification"; 3GPP TSG-RAN-WG2 Meeting #59bis; Shanghai, China, 8th; Oct. 12, 2007; pp. 1-3.

* cited by examiner

METHOD FOR RESELECTING A CELL AND DETECTING WHETHER A TERMINAL IS STATIONARY IN MOBILE TELECOMMUNICATIONS SYSTEM

This application is the National Phase of PCT/KR2008/005727 filed on Sep. 27, 2008, which claims priority under 35 U.S.C. 119(e) to U.S. Provisional Application Nos. 60/975,819, filed on Sep. 28, 2007, 60/983,866 filed on Oct. 30, 2007, 61/007,271 filed on Dec. 11, 2007, 61/018,898 filed on Jan. 4, 2008, and 61/019,575 filed on Jan. 7, 2008 and under 35 U.S.C. 119(a) to Patent Application No. 10-2008-0094998 filed in Republic of Korea on Sep. 26, 2008. All of which are hereby expressly incorporated by reference into the present application.

TECHNICAL FIELD

The present invention relates to a determination of mobility in a mobile communication system, and more particularly, to a method for determining, by a terminal, terminal mobility and deciding a time to select other cell in Evolved Universal Mobile Telecommunications System (E-UMTS) evolved from Universal Mobile Telecommunications Systems (UMTS).

BACKGROUND ART

FIG. 1 shows an exemplary network structure of an Evolved Universal Mobile Telecommunications System (E-UMTS) as a mobile communication system. The E-UMTS system is a system that has evolved from the existing UMTS system, and its standardization work is currently being performed by the 3GPP standards organization. The E-UMTS system can also be referred to as a Long-Term Evolution (LTE) system.

The E-UMTS network can roughly be divided into an E-UTRAN and a Core Network (CN). The E-UTRAN generally comprises a terminal (i.e., User Equipment (UE)), a base station (i.e., eNode B), an Access Gateway (AG) that is located at an end of the E-UMTS network and connects with one or more external networks. The AG may be divided into a part for processing user traffic and a part for handling control traffic. In this case, the access gateway part that processes the user traffic and the access gateway part that processes the control traffic may communicate with a new interface. One or more cells may exist in a single eNB. An interface may be used for transmitting user traffic or control traffic between eNBs. The CN may include the access gateway and a node or the like for user registration of the UE. An interface for discriminating the E-UTRAN and the CN may be used.

The various layers of the radio interface protocol between the mobile terminal and the network may be divided into a layer 1 (L1), a layer 2 (L2) and a layer 3 (L3), based upon the lower three layers of the Open System Interconnection (OSI) standard model that is well-known in the field of communications systems. Among these layers, Layer 1 (L1), namely, the physical layer, provides an information transfer service by using a physical channel, while a Radio Resource Control (RRC) layer located in the Layer 3 (L3) performs the function of controlling radio resources between the terminal and the network.

To do so, the RRC layer exchanges RRC messages between the terminal and the network. The RRC layer may be located by being distributed in network nodes such as the eNode B, the AG, and the like, or may be located only in the eNode B or the AG.

FIG. 2 shows an exemplary control plane structure of a radio interface protocol between a terminal and an E-UTRAN according to the 3GPP radio access network standard. FIG. 3 shows an exemplary user plane structure of a radio interface protocol between a terminal and an E-UTRAN according to the 3GPP radio access network standard.

The structure of the radio interface protocol between the UE and the E-UTRAN will now be described with reference to FIGS. 2 and 3.

The radio interface protocol has horizontal layers comprising a physical layer, a data link layer, and a network layer, and has vertical planes comprising a user plane (U-plane) for transmitting user data information and a control plane (C-plane) for transmitting control signals. The protocol layers in FIGS. 2 and 3 can be classified into a first layer (L1), a second layer (L2), and a third layer (L3) based on three lower layers of an open system interconnection (OSI) standard model widely known in the communication system. The radio protocol layers exist as pairs between the UE and the E-UTRAN and handle a data transmission in a radio interface.

The layers of the radio protocol control plane of FIG. 2 and those of the radio protocol user plane of FIG. 3 will be described as follows.

The physical layer, the first layer, provides an information transfer service to an upper layer by using a physical channel. The physical layer is connected to an upper layer called a medium access control (MAC) layer via a transport channel. Data is transferred between the MAC layer and the physical layer via the transport channel. The transport channel is divided into a dedicated transport channel and a common channel according to whether or not a channel is shared. Between different physical layers, namely, between a physical layer of a transmitting side and that of a receiving side, data is transmitted via the physical channel.

The second layer includes various layers. First, a medium access control (MAC) layer performs mapping various logical channels to various transport channels and performs logical channel multiplexing by mapping several logical channels to a single transport channel. The MAC layer is connected an upper layer called a radio link control (RLC) layer by a logical channel. The logical channel is divided into a control channel that transmits information of the control plane and a traffic channel that transmits information of the user plane according to a type of transmitted information.

A Radio Link Control (RLC) layer, the second layer, segments and/or concatenates data received from an upper layer to adjust the data size so as for a lower layer to suitably transmit the data to a radio interface. In addition, in order to guarantee various QoSs (Quality of services) required by each radio bearer RB, the RLC layer provides three operational modes: a TM (Transparent Mode); a UM (Unacknowledged Mode); and an AM (Acknowledged Mode). In particular, the RLC layer (referred to as an 'AM RLC layer', hereinafter) operating in the AM performs a retransmission function through an automatic repeat and request (ARQ) function for a reliable data transmission.

A Packet Data Convergence Protocol (PDCP) layer of the second layer performs a function called header compression that reduces the size of a header of an IP packet, which is relatively large and includes unnecessary control information, in order to effectively transmit the IP packet such as an IPv4 or IPv6 in a radio interface having a narrow bandwidth. The header compression increases transmission efficiency between radio interfaces by allowing the header part of the data to transmit only the essential information.

The Radio Resource Control (RRC) layer located at the lowermost portion of the third layer is defined only in the control plane, and controls a logical channel, a transport channel and a physical channel in relation to configuration, reconfiguration, and the release of radio bearers (RBs). In this case, the RBs refer to a logical path provided by the first and second layers of the radio protocol for data transmission between the UE and the UTRAN. In general, configuration (or establishment) of the RB refers to the process of stipulating the characteristics of a radio protocol layer and a channel required for providing a particular data service, and setting the respective detailed parameters and operational methods.

If the RRC of the terminal forms a logical connection with the RRC of the wireless network, the terminal is in an "RRC connected mode. Conversely, if there is no logical connection between the RRC of the terminal and the RRC of the wireless network, the terminal is in an "RRC idle mode."

The Non-Access Stratum (NAS) layer located at the upper portion of the RRC layer performs a function of a session management, a mobility management, and the like.

For the downlink transport channels for transmitting data from the network to the terminal, there are Broadcast Channel (BCH) for transmitting system information, a downlink Shared Channel (SCH) for transmitting user traffic or a control message, and the like. The downlink SCH or a separate downlink Multicast Channel (MCH) may be used to transmit traffic of a downlink MBMS or a control message. Meanwhile, for the uplink transport channels for transmitting data from the terminal to the network, there are Random Access Channel (RACH) for transmitting an initial control message, an uplink Shared Channel (SCH) for transmitting user traffic or a control message, and the like.

The eNB manages radio resources of one or more cells, and one cell is set to one of bandwidths of 1.25, 2.5, 5, 10, 20 MHz so as to provide a downlink or uplink transmission service to a plurality of terminals. Here, different cells may also be configured to provide different bandwidths. The eNB informs the terminals about basic information necessary for an access to the network by using system information (hereinafter, referred to as "SI"). In addition, the eNB may inform the terminals about information of cells (Neighbor Cell List; NCL) adjacent to a cell where the base station provides a service. The system information may include all required information that the terminal should know for a connection with the base station. Accordingly, before the terminal attempts to connect with the base station, it should receive all system information and always have the latest system information. In addition, considering that all terminals within one cell should know the system information, the base station periodically transmits the system information.

Next, description of a cell selection process by a terminal in an idle mode will be given in detail. The cell selection is basically to register for the network such that the terminal receives a service from the base station. Here, if a signal strength or quality between the terminal and the base station becomes deteriorated due to terminal mobility, the terminal would re-select another cell in order to maintain a quality of data transmission. Hereinafter, characteristics of the physical signal, such as the signal strength and a ratio of noise/interference to a signal, may be simply referred to as signal characteristics.

There are methods for selecting or re-selecting a cell according to the signal characteristics depending on the wireless environment. If a cell is to be re-selected, the following cell re-selection methods may be used according to a Radio Access Technology (RAT) of a cell and frequency characteristics.

Intra-frequency cell re-selection: the terminal re-selects a cell having the same RAT and the same center-frequency as a cell currently being used by the terminal.

Inter-frequency cell re-selection: the terminal re-selects a cell having the same RAT and a different center-frequency from the cell currently being used by the terminal.

Inter-RAT cell re-selection: the terminal re-selects a cell using a different RAT from a RAT currently being used by the terminal, or re-selects a cell according to priorities set among different frequencies or RATs.

FIG. 4 illustrates a procedure of a cell selection operation by a terminal in an idle mode.

S1: The terminal selects a Radio Access Technology (RAT) for a communication with a network (Public Land Mobile Network; PLMN) from which the terminal desires to receive a service. The PLMN and RAT information may be selected by a terminal user or may be stored in the USIM.

S2: The terminal selects a cell having the greatest value among cells whose signal strength with the base station or a quality is determined to be greater than a certain value. Then, the terminal receives SI periodically sent from the base station. The certain value denotes a value defined by the system so as to guarantee a quality for a physical signal during data transmission/reception. Therefore, the certain value may be different according to the RAT to be applied.

S3: The terminal registers its information (e.g., IMSI) to receive a service (e.g., paging) from the network. The terminal does not register for the network desiring to access whenever it selects a cell, but registers for the network if network-related information (e.g., Tracking Area Identity; TAI) received from the SI is different from information which the terminal has.

S4: If a value of a signal strength or quality measured from the base station currently providing a service to the terminal is determined to be smaller than a value measured from a base station of a neighboring cell, the terminal selects one of other cells capable of providing better signal characteristics than the cell of the base station accessed by the terminal. This process is referred to as the cell re-selection, which is distinguished from an initial cell selection. Here, in order to prevent frequent occurrence of cell re-selections due to the changes of the signal characteristics, there is a time restriction. In the LTE system, targets of the signal measurement may include a Reference Symbol Received Power (RSRP), Reference Symbol Received Quality (RSRQ), and Received Signal Strength Indicator (RSSI).

Hereinafter, descriptions of a cell selection method and procedure thereof in WCDMA will be given in detail.

conditions of the cell selection: [Formula 1]
$$Srxlev > 0 \text{ AND } Squal > 0$$
Where:
$$Squal = Qqualmeas - Qqualmin$$
$$Srxlev = Qrxlevmeas - Qrxlevmin - Pcompensation$$

| Parameter | Description |
|---|---|
| Squal | Cell Selection quality value (dB) |
| Srxlev | Cell Selection RX level value (dB) |
| Qqualmeas | Measured cell quality value expressed in CPICH Ec/N0 (dB) |
| Qrxlevmeas | Measured cell CPICH RSCP RX level value (dBm). |
| Qqualmin | Minimum required quality level in the cell (dB) |

| | |
|---|---|
| Qrxlevmin | Minimum required RX level in the cell (dBm) |
| Pcompensation | RF dependent value (dB) |

[Formula 1] indicates conditions of the cell selection by the terminal in WCDMA.

When the terminal is initially turned on, the terminal selects PLMN and RAT for a wireless communication. In the initial cell-selection corresponding to S2 in FIG. 4, the terminal selects and accesses a cell having the greatest signal characteristic value, among cells which meet the conditions of [Formula 1] through the signal measurements with the base station in all searchable frequency bandwidths. In the WCDMA system, target values of the signal measurement may include CPICH RSCP, CPICH Ec/NO and Carrier RSSI.

As shown in [Formula 1], the terminal selects a cell whose measured signal strength and quality are greater than a specific value (strength: Qrxlevmin+Pcompensation, quality: Qqualmin) defined by the system. Here, the Qrxlevmin, Qqualmin, Pcompensation values are values notified by the base station to the terminal through SI. Then, the terminal waits in the idle mode so as to request a service from the network (e.g., originating a call) or to receive a service from the network (e.g., terminating a call). The terminal in the idle mode repeats a process of re-selecting the cell which has better signal characteristic through signal measurements of a serving cell and a neighboring cell. In this instance, if a signal characteristic value of a serving cell is greater than a specific value (e.g., Ssearch), the terminal does not need to perform the cell re-selection, thereby not performing the measurement.

FIG. 5 is a flowchart showing a cell re-selection method in WCDMA with respect to S4 in FIG. 4. Referring to FIG. 5, through periodic measurements, the idle terminal selects a cell corresponding to Rn if a cell having the greatest characteristic value meets a condition of Rn>Rs for a specific period of time (Treselection*) through a ranking process for comparing a signal strength and quality, among cells whose signal characteristic values (Rs) of serving cells and signal characteristic values (Rn) of neighboring cells meet the conditions of [Formula 1]. That is, the terminal selects another cell (Rn) having the better signal characteristic than the serving cell (Rs). Rs and Rn are the values obtained through the calculation process of [Formula 1].

$R_s = Q_{meas,s} + Qhyst_s + Qoffmbms$ $R_n = Q_{meas,n} + Qoffset_{s,n} + Qoffmbms$ [Formula 2]

[Formula 2] is used by the terminal for the ranking process among cells in WCDMA.

In [Formula 2], Qmeas,s denotes a CPICH Ec/NO value of a serving cell measured by the terminal, and Qmeas,n denotes CPICH Ec/NO value of neighboring cells measured by the terminal. Qhysts is used by the terminal to apply weight to a serving cell. Qoffsets,n may be used to have a bias between a cell currently connected and a cell to be moved, and Qoffmbms may be used to apply weight to a cell which supports a Multimedia Broadcast Multicast Service (MBMS) service.

Meanwhile, the value "Treselection*" is used to put a restriction that the conditions of the cell re-selection should be met more than a certain period of time so as to prevent the terminal from repeatedly selecting a specific cell. The value "Treselection*" is determined by a Treselection' value transmitted from the base station to the terminal through SI and a speed determined by the terminal. Description of the operation of the terminal to determine such Treselection* will be given in detail with reference to FIG. 6.

FIG. 6 is a flowchart illustrating a method for determining a speed by a terminal after cell re-selection in WCDMA.

In the present invention, Treselection' represents a time restriction received from the base station, and 'Treselection* represents a value obtained by applying a scaling factor to the Treselection' of the terminal.

In FIG. 6, if a frequency of a cell selection for a specific period of time (TCRmax) is greater than a certain value (NCR), it considers itself as a high mobility UE. Conversely, if a frequency of a cell selection does not meet the condition of the NCR, it considers itself as a low mobility UE. If the condition for the high mobility cannot be satisfied for a certain period of time (TCRmaxHyst) even after it has been determined as the high mobility UE, it is again determined as the low mobility UE. If high mobility is finally determined, the terminal multiplies the Treselection value by a scaling factor (a value having units of 0.1 between 0 and 1) and thereby to determine a selection time according to a speed at the cell re-selection. That is, if the frequency of the cell change is high, the terminal determines that the speed gets faster, and reduces the time restriction in the cell re-selection so as to make the cell re-selection faster, thereby receiving a service in a cell having good signal characteristics, thus to minimize an error in interpretation of a signal transmitted by a transmitter. The values of TCRmax, NCR, TCRmaxHyst, Treselection and Scaling Factor are provided by the base station through SI, and the table below shows values selected by the base station for transmission.

| Parameter | Value type |
|---|---|
| TCRmax | Enumerated (not used, 30, 60, 120, 180, 240 sec) (sec: second) |
| NCR | Integer (1 ... 16) |
| TCRmaxHyst | Enumerated (not used, 10, 20, 30, 40, 50, 60, 70 sec) |
| Treselection | Integer (0~31), sec |
| Scaling Factor for Treselection | Real (0~by step of 0.1) |

In addition, the LTE system has specific reference values (NCR_M, NCR_H) for detecting one or more speeds, thus to facilitate speed detection of 3 stages.

SUMMARY OF THE INVENTION

If a terminal receives a service from a base station by selecting a cell having good signal characteristics, an error which may occur in data transmission/reception between the terminal and the base station can be minimized, which directly leads to the quality of service. Accordingly, if a signal strength and quality between the terminal and the base station become deteriorated due to terminal mobility, it would be essential to re-select the cell having good signal characteristics. However, if the cell is re-selected, the terminal is required to additionally perform operations of reading system information, registering for a network, etc. in order to receive a service in the selected cell. During this process, it would be difficult for the terminal to request a service (e.g., RRC connection request) or to receive a service (e.g., paging) from the base station. That is, delay for the service would occur.

Accordingly, there is a need to have a method for minimizing any possible service delay which may occur such that the terminal prevents frequent cell re-selection while performing the re-selection of a cell having good signal characteristics within a short period of time in case the signal characteristics become deteriorated. In the related art, time restriction such as Treselection is used to prevent the frequent cell selection.

And, by multiplying the Treselection by a scaling factor (e.g., 0.5), a time taken for the cell re-selection is reduced for a fast cell change in case of a high mobility terminal, thereby making the cell re-selection fast.

However, the related art method for determining the scaling factor is a method for detecting terminal mobility by using the frequency of re-selection of a cell at a specific time point. This does not consider any arrangement structure of a cell actually providing a wireless service. Therefore, if the terminal is positioned adjacent to a boundary of multiple cells, and although the terminal does not move, several cells may be repeatedly selected due to radio fluctuation. This is referred to as 'Ping-Ping situation.'

Hereinafter, description of an exemplary ping-pong situation will be given with reference to FIG. 7.

While the terminal moves from a cell A to a target area (solid dot in FIG. 7), the terminal would pass cells C, B and D. Here, the terminal passes multiple cells within a short period of time via a boundary of the multiple cells, thereby considering itself as a high mobility terminal, thus to reduce a Treselection in half by applying Treselection (e.g., 10 seconds) to a scaling factor (e.g., 0.5). The terminal camping on the target area selects one of the available candidates for the re-selection, including the cell B, the cell D or the cell E. Since the terminal is positioned at the boundary of multiple cells and the measurement value of the radio frequency measured by the terminal has a fluctuation, the terminal would repeat the re-selection of the multiple cells even for a slight movement (e.g., cell B→cell D→cell E→cell B→D→cell E). Due to the shortened (reduced) Treselection value, the cell re-selection occurs more frequently, thereby causing a delay of a service to the terminal.

Therefore, the present invention is to determine a stationary state of the terminal by using wireless environmental variation such as arrangement structure of a cell where the terminal is positioned, and if the terminal is determined to be stationary, a time restriction for cell re-selection for allowing the terminal to move to another cell is increased, thereby minimizing the service delay as mentioned above.

To achieve these objects, there is provided a method for selecting a cell in a mobile communication system, which selects a cell according to terminal mobility in a mobile communication system comprised of a plurality of cells, including:

(a) determining whether or not a terminal is in a stationary state; and (b) adjusting a control value for cell selection related to the terminal mobility according to the determination.

Preferably, the stationary state of the terminal is determined by the terminal based on a variation regarding the stationary state.

Preferably, the stationary state of the terminal is determined at a specific time point, for specific period of time or upon occurrence of a specific event.

Preferably, the control value for the cell selection is a timer value (Treselection) associated with the cell selection according to the terminal mobility.

Preferably, the variation is a value obtained based on a first measurement and a second measurement, and wherein, in the first measurement, the terminal measures each signal strength or each cell ID of neighboring cells for a timer time (TCRmax), and in the second measurement, the terminal measures each signal strength or each cell ID of neighboring cells for the timer time (TCRmax).

Preferably, the stationary state of terminal is determined by comparing the variation with a threshold.

Preferably, the control value for the cell selection is a measurement report transmitted from the terminal to a base station, and the measurement report includes each signal characteristic value of neighboring cells measured by the terminal.

Preferably, the step (a) is performed when the terminal is in an idle mode or in a connected mode.

Preferably, the variation is obtained from information about signal strength of searched cells for an operation time (TCRmax) of a specific timer, or obtained based on the number of the cell identifiers (ID) of the searched cells for the operation time (TCRmax) of the specific timer.

In addition, in order to solve the above-described related art problems, there is provided a method for detecting a stationary state of a terminal in a mobile communication system, in a method for selecting a cell according to terminal mobility in a mobile communication system comprised of a plurality of cells, including:

(A) obtaining a variation so as to determine whether or not the terminal positioned at a boundary of the plurality of cells is in a stationary state;

(B) determining the stationary state of the terminal by comparing the variation with a threshold; and (C) if the terminal is determined to be in the stationary state, adjusting a value of a cell selection-related timer (Treselection).

Preferably, the variation in step (B) is obtained by measuring signal strength of neighboring cells or the number of cell IDs of searched neighboring cells for at least twice for an operation time (TCRmax) of a specific timer.

Preferably, the variation is calculated by measurement which the terminal measures signal variation of the neighboring cells periodically or upon occurrence of an event, or is calculated by applying weight for a condition when there is no change in the number of neighboring cells measured by the terminal or in a variation for a certain period of time.

EFFECT

The present invention detects a stationary state in a cell re-selection process by using information associated with a change in cell numbers measured by the terminal and a change of signal characteristics of the cells, thereby capable of adjusting a size of a time restriction for the cell re-selection.

Accordingly, it can prevent the frequent cell selection by the terminal, thereby reducing the service delay caused by the cell re-selection, thus to enhance service satisfaction for a user.

DETAILED DESCRIPTION OF THE INVENTION

Figure 1:
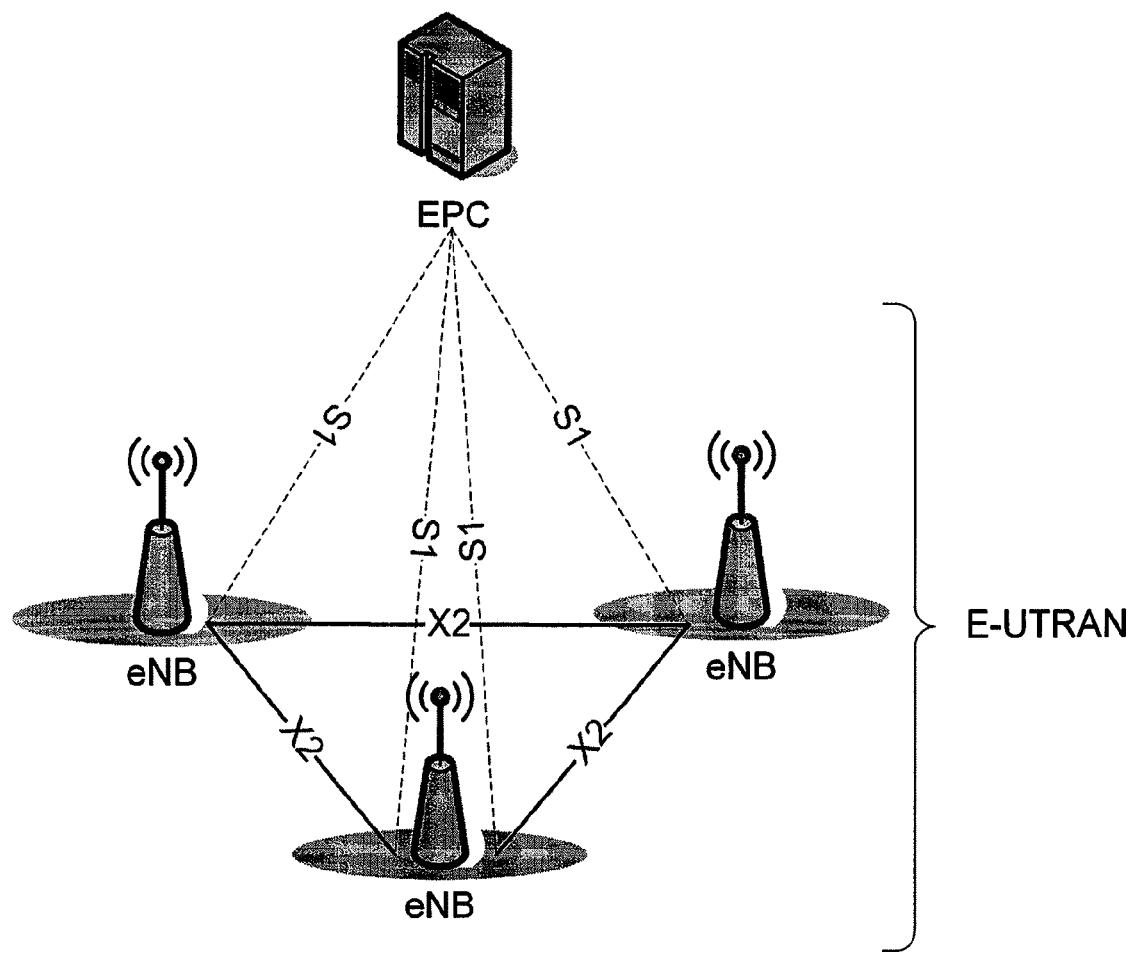
FIG. 1 shows a network structure of a Long Term Evolution (LTE), the related art mobile communication system.
Figure 2:
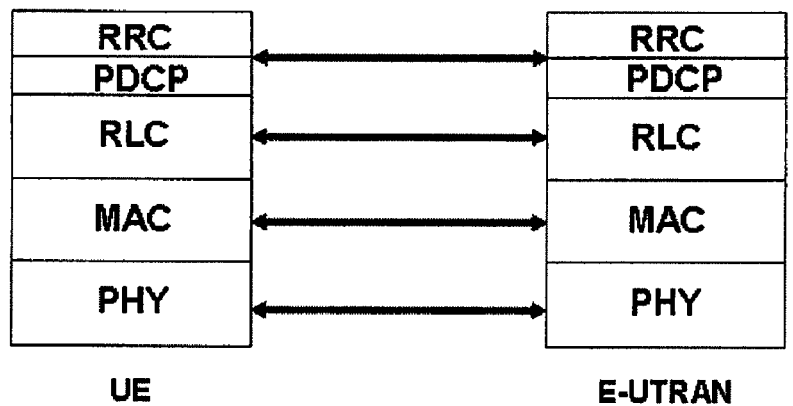
FIG. 2 shows the architecture of a control plane of a radio interface protocol between a terminal and an Evolved-UMTS Terrestrial Radio Access Network (E-UTRAN) based on 3GPP radio access network standards.
Figure 3:
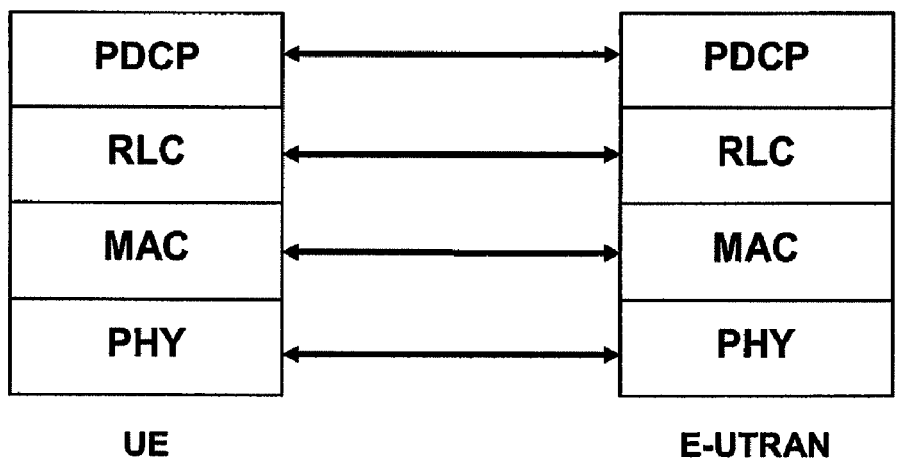
FIG. 3 shows the architecture of a user plane of the radio interface protocol between a terminal and an Evolved-UMTS Terrestrial Radio Access Network (E-UTRAN) based on 3GPP radio access network standards.
Figure 4:
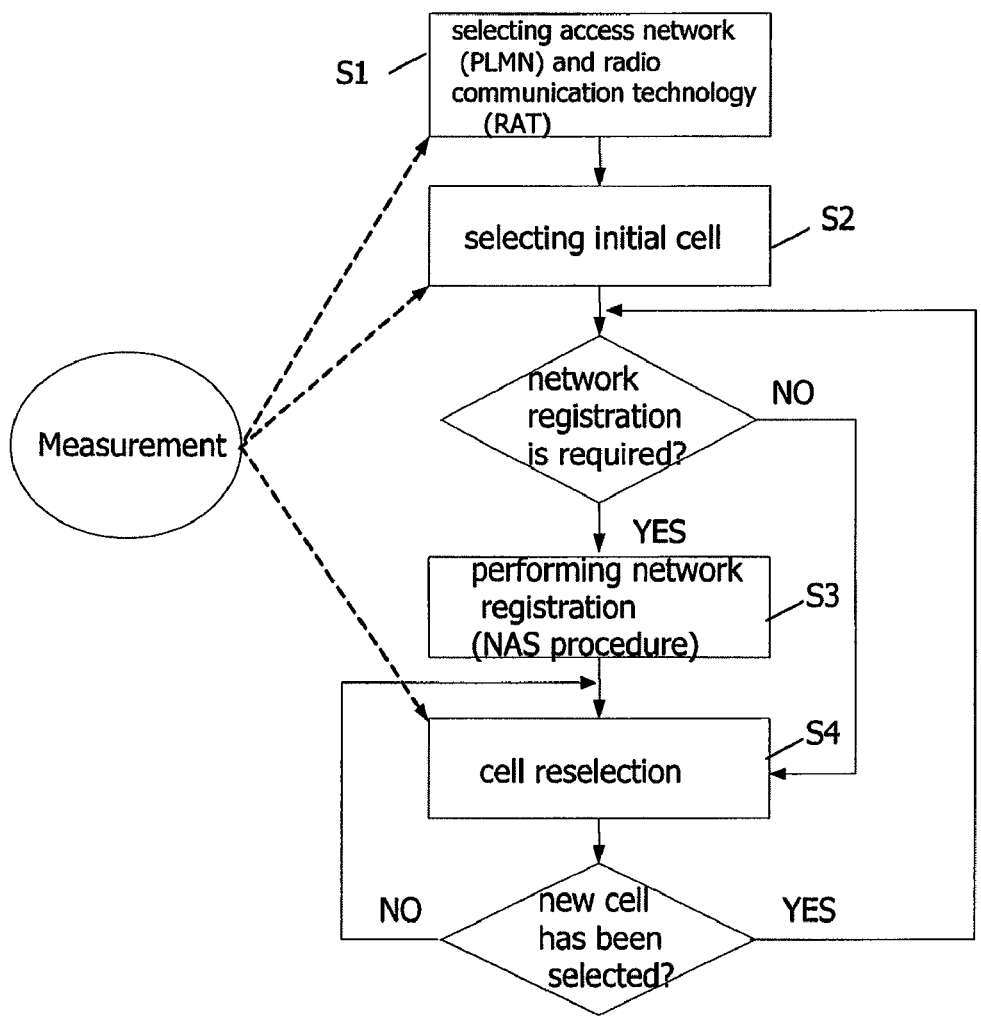
FIG. 4 shows a procedure of cell selection operation by a terminal in an idle mode.

The present invention is applied to a mobile telecommunications system and, more particularly, to an Evolved Universal Mobile Telecommunications System (E-UMTS) that has evolved from UMTS. However, without being limited thereto, the present invention may be also applied to any mobile telecommunications system and communication protocol to which technical features of the present invention is applicable.

Various modifications and embodiments can be made in the present invention, and reference will be made in detail to the preferred embodiments of the present invention, examples of which are illustrated in the accompanying drawings.

However, it should also be understood that embodiments are not limited by any of the details of the foregoing description, but rather should be construed broadly within its spirit and scope and it is intended that the present invention cover modifications and variations of this invention provided they come within the scope of the appended claims and their equivalents.

Though terms including ordinal numbers such as a first, a second, etc. may be used to explain various components, the components are not limited to the terms. The terms are used only for the purpose of distinguishing one component from another component. For instance, a first component may be referred to as a second component, or similarly, the second component may be referred to as the first component, without departing from the scope of the present invention. A term 'and/or' is used to include a combination of a plurality of disclosed items or one of the items.

In case it is mentioned that a certain component is "connected" or "accessed" to another component, it may be understood that the certain component is directly connected or accessed to the another component or that a component is interposed between the components. On the contrary, in case it is mentioned that a certain component is "directly connected" or "directly accessed" to another component, it should be understood that there is no component therebetween.

Terms used in the present invention is to merely explain specific embodiments, thus it is not meant to be limiting. A singular expression includes a plural expression except that two expressions are contextually different from each other. In the present invention, a term "include" or "have" is intended to indicate that characteristics, figures, steps, operations, components, elements disclosed on the specification or combinations thereof exist. Rather, the term "include" or "have" should be understood so as not to pre-exclude existence of one or more other characteristics, figures, steps, operations, components, elements or combinations thereof or additional possibility.

Except that they are not differently defined, all terms used in the present invention including technical or scientific terms have the same meanings with terms that are generally understood by those skilled in the art related to the field of the present invention. The terms same as those of which are defined in a general dictionary should be understood that the terms have meanings same as contextual meanings of the related art. And, as long as the terms are not definitely defined in the present invention, the terms are not interpreted as ideal or excessively formal meanings.

Reference will now be given in detail to the preferred embodiments of the present invention, examples of which are illustrated in the accompanying drawings. Wherever possible, the same reference numerals will be used throughout the drawings to refer to the same or similar parts, and the same descriptions thereof are omitted.

The present invention is directed to prevent frequent cell selection by a terminal due to a ping-pong situation when the terminal is camping on a cell boundary (i.e., an area where plural cells are overlaid, and a service or data can be provided from each base station of the plural cells) (i.e., a state when the terminal moves slowly or does not move, hereinafter referred to as 'stationary state').

Thus, a basic concept of this invention is that a terminal determines terminal mobility by using variation information related to signal characteristic values of specific cells which can be measured, and appropriately adjusts (controls) a size of time restriction (e.g., Treselection) of a cell re-selection, thereby preventing frequent occurrence of cell selection such as a ping-pong situation, thus to reduce an unnecessary service delay due to the cell re-selection and enhance service satisfaction of a user.

In order to implement the basic concept of the present invention, the terminal according to the present invention detects (determines, checks or analyzes) a stationary state of the terminal based on a change in the number of measurable cells and a variation in a signal characteristic value.

In particular, the present invention proposes to calculate a variation of measurable cells so as to detect a stationary state, detect the stationary state based on the calculated variation, and determine a scaling factor for adjusting a size of a time restriction for a cell re-selection. The method for detecting a stationary state proposed in the present invention may also be considered as a method for determining a degree of terminal mobility.

For this, the present invention proposes for the base station to transmit, to the terminal, a value indicating a variation and a degree of a stationary state, a value used to determine the stationary state, a plurality of scaling factor values corresponding to the degree of the stationary state, and other necessary elements required to calculate the scaling factor periodically or based on determination of the base station.

The base station should provide the following elements to the terminal in the present invention.

Variation and scaling factor value (variation: scaling factor)
  example 1: {0~40 dbm: 1.5, 41~70 dbm: 1.2, 71~more than 100) dbm:1}
  scaling factor value with respect to a variation range (dbm unit) of a specific signal characteristic value (e.g., RSRP)
  example 2: {0: 1.5, 1~2: 1.2, more than 2:1}
  scaling factor value with respect to a variation by the changed number of cells.
Timer and threshold applied to the variation calculation
  a signal characteristic value measuring timer and threshold
  a variation update timer and threshold
  a scaling factor update timer and threshold, and the like.

Value used for variation calculation
A: a specific value set by a service provider (an operator) according to a cell arrangement
B: the number of cells
C: a specific value according to a specific frequency and radio access technology
D: a signal characteristic value, etc.
A weight applied to A, B, C and D Preferably, during the above process, as targets of signal characteristics for which the terminal measures a variation of a specific cell, there are RSRP, RSRQ, RSSI, CPICH RSCP, CPICH Ec/NO, Carrier RSSI, and the like.

Preferably, during the above process, instead of a method for receiving, from a base station, a scaling factor to be applied depending on the variation, the terminal may directly receive one or more factors (e.g., Treselection) corresponding to mobility based on the variation so as to apply the same to the cell re-selection.

In the present invention, in order for the terminal to detect the stationary state, a method for selecting specific cells serving as a measurement target except for the serving cell may include a method for selecting a cell searched by using a neighbor cell list (NCL) of the serving cell received from the base station, or a method for detecting and selecting a cell through a process such as scanning, synchronization, etc. by the terminal itself without having any information (e.g., NCL). In addition, among the selected cells, cells only satisfying the minimum signal characteristic value defined by the system can be targets of the variation measurement. Or, other cells having other frequencies and radio access technology (RAT) may be a measurement target. Hereinafter, the cell serving as the measurement target is referred to as a measurement cell.

The terminal obtains a variation of the signal characteristic based on the thusly selected measurement cell, and the variation may be calculated as below:

sum or average of the number of cells not having the same cell ID within a measurement cell set measured before and after a specific time point.

statistical value, such as sum, average, standard deviation, variance, etc. of signal characteristic differentials among cells having the same cell ID within a measurement cell set measured before and after a specific time point.

sum or average of the number of cells not having the same cell ID within a measurement cell set measured before and after a specific period of time.

statistical value, such as sum, average, standard deviation, variance, etc. of signal characteristic differentials among cells having the same cell ID within a measurement cell set measured before and after a specific period of time.

In more detail, the specific time point or the specific period of time refers to a period or an event by a threshold. The terminal calculates a measured signal variation of the measurement cell based on a measurement value periodically or upon occurrence of an event, and determines a stationary state based on the calculated variation, and thusly to obtain a degree of the stationary state. In addition, a variation may be calculated by applying weight with respect to a condition when there is no change in the number of the measurement cells or the variation for the specific period of time.

If the stationary state is detected based on the variation, the scaling factor is updated according to the detected stationary state. The reference time point for updating the scaling factor may be a time point when a variation or a stationary state exceeds a threshold, a time point of a cell re-selection, a time point when a specific timer has expired, or the like.

In more detail, the specific timer may be implemented as a timer for measurement, a timer for updating a scaling factor or the like.

Information associated with the specific timer used by the terminal to measure the measurement cell or a threshold of a variation may be a value defined by the system or a value received from the base station through system information or an RRC signal.

Figure 8:
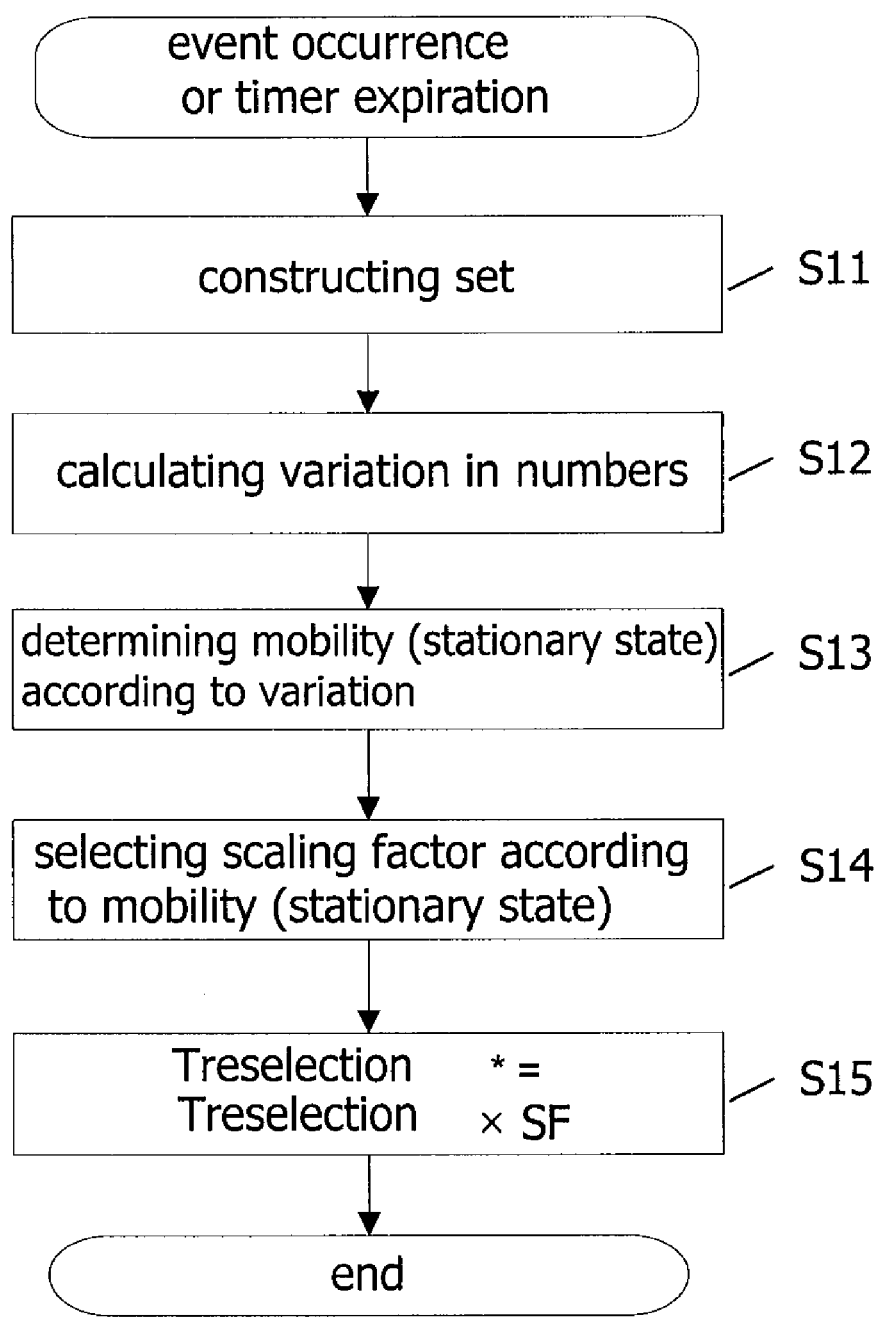
FIG. 8 is a flowchart showing a calculation process of a cell re-selection time restriction according to one embodiment of the present invention.

FIG. 8 is a flowchart showing a calculation process of cell re-selection time restriction according to one embodiment of the present invention. FIG. 8 illustrates an example of detecting a stationary state by using a change of the number of the measurement cells and obtaining a time restriction (Treselection*) to be used in the cell re-selection. The exemplary embodiment in FIG. 8 describes an example of obtaining a variation based on the changed number of measurement cells collected by the terminal in every specific period.

S11: The terminal forms (constructs) a measurement cell periodically or upon occurrence of an event, and performs a measurement to the measurement cell for a certain period of time. And, if a timer informing an update of the scaling factor has expired, the terminal constructs a plurality of sets (e.g., two sets of measurement values) of the measurement value of the measurement cell based on the expired time point. As an example of forming the set of the measurement value, a set (a first set) satisfying a certain measurement value before the update timer has expired is constructed, and then another set (a second set) satisfying a certain measurement value after the timer has expired is constructed.

S12: Among the constructed sets of the measurement value, the measurement value of the specific cell belongs to any one set but may not be in another set (e.g., the cell A has been constructed as the first set in the previous measurement by the timer, however, is not constructed as the second set in the measurement after the expiry of the timer.). Alternatively, among the constructed sets of the measurement value, a cell having the same cell ID satisfying a certain signal characteristic value belongs to any one set but may not be in another set. That is, the measurement cell may be newly constructed or disappeared due to the terminal mobility. For this, the number of the cells which do not have the same cell ID in the plurality of sets is calculated. This is referred to as the "variation in numbers." For reference, an average number variation may be obtained by calculating a variation in numbers compared with the number of entire measurement cells. For instance, the variation in numbers in two measurement cell sets {A, B, C} and {B, C, E} is 2 as a sum of the A and E, and the average variation in numbers is approximately 0.33(=2/6).

Hereinafter, for the convenience in explanation, examples of detecting the stationary state by using the "variation in numbers" in the present invention will be described.

S13: A degree of mobility is determined by a degree of a variation of the measurement cell. For instance, if a value {0~2: 1.2} has been transmitted from the network so as to detect the stationary state in case the cell change is less than 2, a change in the numbers of the measurement cells from 0 to 2 is used as a value for detecting the stationary state, and in case the cell change in the measurement cell set is 1, the terminal may determine the stationary state.

S14: The stationary state is determined based on the variation, and a scaling factor may be selected according to a degree of the stationary state received through system information. From the above example, the terminal applies the scaling factor of 1.2 to the change in the numbers of the measurement cells less than 2.

S15: The cell re-selection time restriction value is updated using the selected scaling factor (i.e., Treselection*=Treselection×Scaling factor). In the above example, the value 1.2 is multiplied by the Treselection. That is, if Treselection is set to 10 seconds, the Treselection* value to be applied to the cell re-selection would be 12 seconds.

Figure 5:
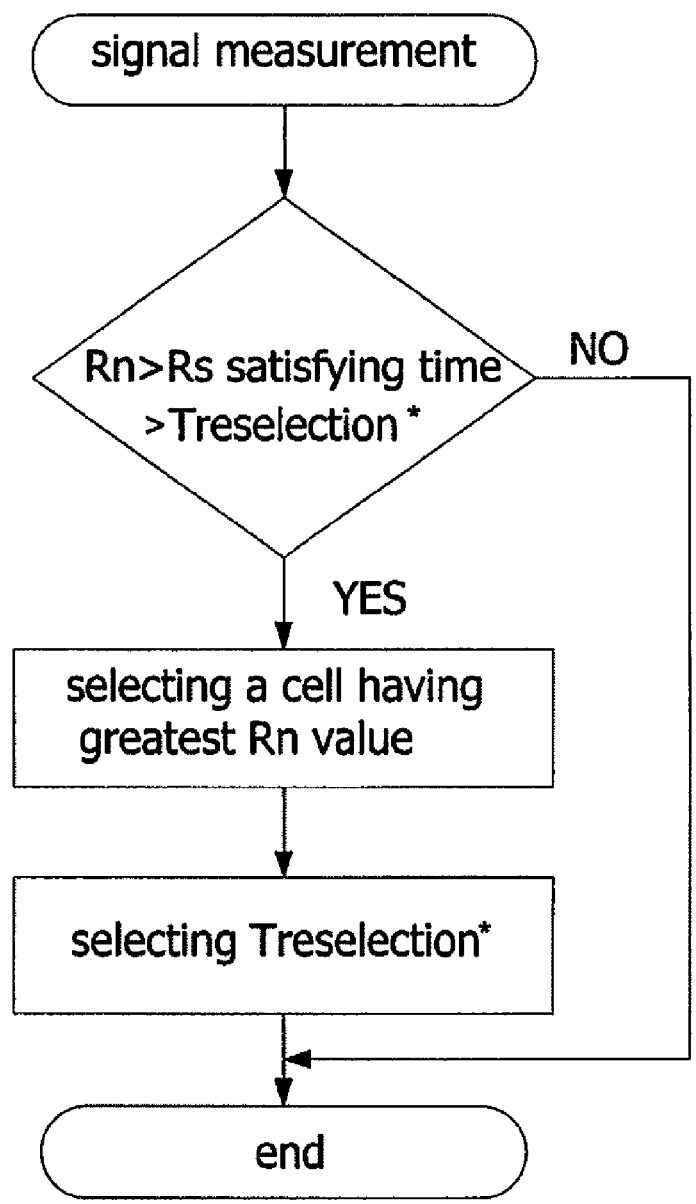
FIG. 5 is a flowchart showing a cell re-selection method in WCDMA with respect to S4 in FIG. 4.
Figure 6:
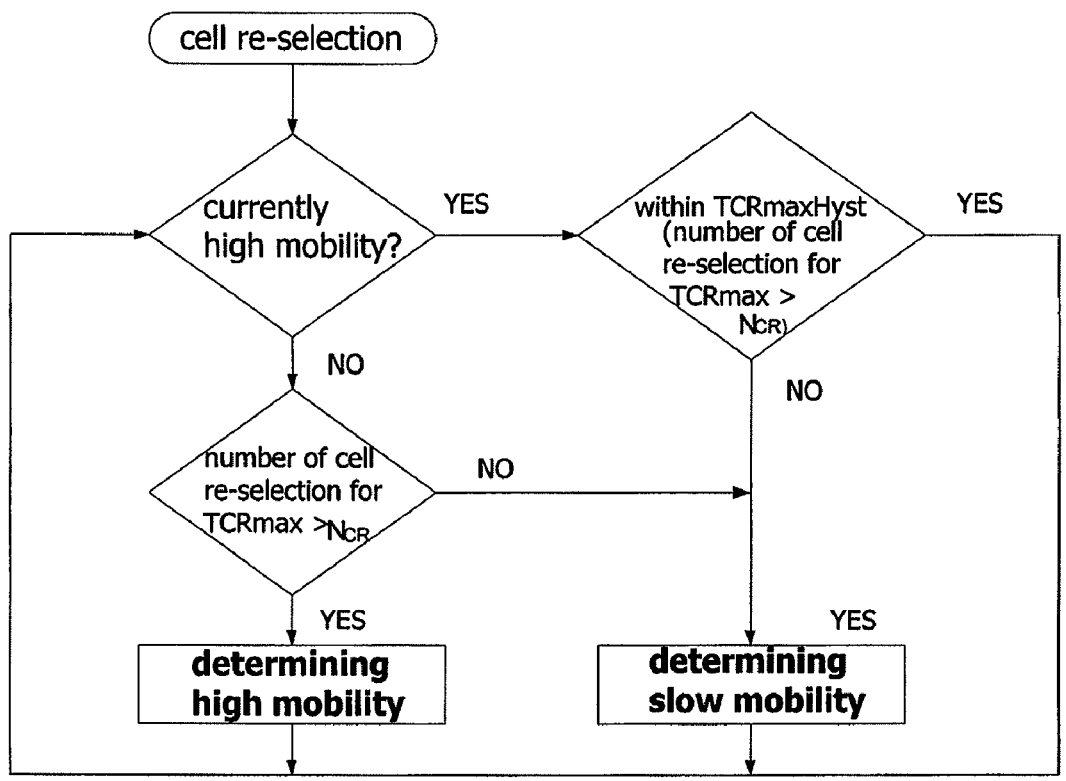
FIG. 6 is a flowchart illustrating a method for determining a speed by a terminal after cell re-selection in WCDMA.
Figure 7:
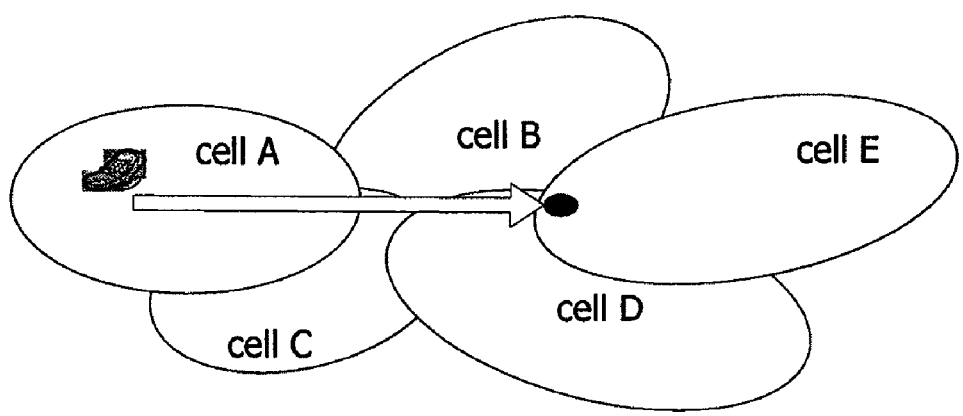
FIG. 7 is an exemplary view of a cell re-selection process according to a movement of a terminal in WCDMA.

The present invention adjusts a time restriction (Treselection) in the cell re-selection by using the variation of the cells measured by the terminal, thus to control the time for a cell change. A fixed time restriction (Treselection*) functions as a time condition in the cell re-selection process in FIG. 5. In addition, if the values Rn and Rs in FIG. 5 are to be described through [Formula 1], the values, such as Qoffset and Qhyst, are the values applying weight to the measurement value of the terminal, thereby affecting the time for the cell change. Accordingly, such values may be used to adjust the time for the cell re-selection by applying the scaling factor depending on the variation proposed in the present invention.

In addition, the present invention may also be applied to the terminal in the RRC connected mode. For instance, if a signal characteristic value of a serving cell becomes less than a threshold, the terminal in the RRC connected mode measures neighboring cells and sends a measurement report of the measured signal characteristic values to the base station. Then, the base station determines a cell to which the terminal would be moved based on the signal characteristic values of the neighboring cells through the measurement report received from the terminal. The base station transmits a handover command to the terminal such that the terminal receives a service from other cell. In such process of sending the measurement report by the terminal, the measurement report is sent to the base station if a condition satisfying a specific condition (e.g., measurement value>threshold) by the neighboring cell satisfies a specific time (time-to-trigger). Therefore, the specific time (time-to-trigger) to send the measurement report based on the variation proposed in the present invention can be adjusted according to the stationary state (i.e., the degree of mobility), thereby capable of adjusting a time for the base station to perform a handover to the terminal. Accordingly, it is observed that the time for allowing the RRC connected terminal to move to another cell can be adjusted.

Hereinafter, another example applied to the present invention will be described.

As described in FIG. 5, when the terminal is to re-select a cell, the terminal selects the cell (Rn) having a greater signal characteristic value than the current serving cell (Rs). Accordingly, the stationary state may be detected by using ID information of candidates used to select the serving cell.

For instance, cells corresponding to the Rn in the serving cell A (i.e., Sn is A) are B, C, and D (time point T). Since the cell C has the greatest signal characteristic value for a specific period of time (Treselection, e.g., 10 sec.), the terminal re-selects the cell C (i.e., the serving cell is changed from the cell A into the cell C). Thereafter, if cells corresponding to the Rn in the serving cell C (i.e., Rs is C) are A, B, and D (time point T+1), the cells of Rn+Sn become A, B, C, and D in two cases (the time points T and T+1 each for comparing the neighboring cell and the signal strength in the serving cell), thus to be the stationary state, (i.e., the terminal moves very slowly). Therefore, in this case, if the cell re-selection is performed from the serving cell C to other neighboring cell, the Treselection* (e.g., 13 sec.=10 sec.×1.3) applied in the stationary state is applied to perform the cell re-selection with a longer (extended) cell re-selection time restriction. In addition, even though the number of cell IDs corresponding to the Rn+Sn is different (e.g., only one cell ID is different), a threshold may be given so as to enable the detection of the stationary state, and a plurality of thresholds may be given so as to enable the detection of the multi-phase stationary state.

Preferably, a factor required for all such operations is provided by the network, and may be transferred to the terminal through system information, RRC messages such as RRC connection reconfiguration as well as L1/L2 control signaling (e.g., PDCCH) or MAC/RLC/PDCP PDU.

Figure 9:
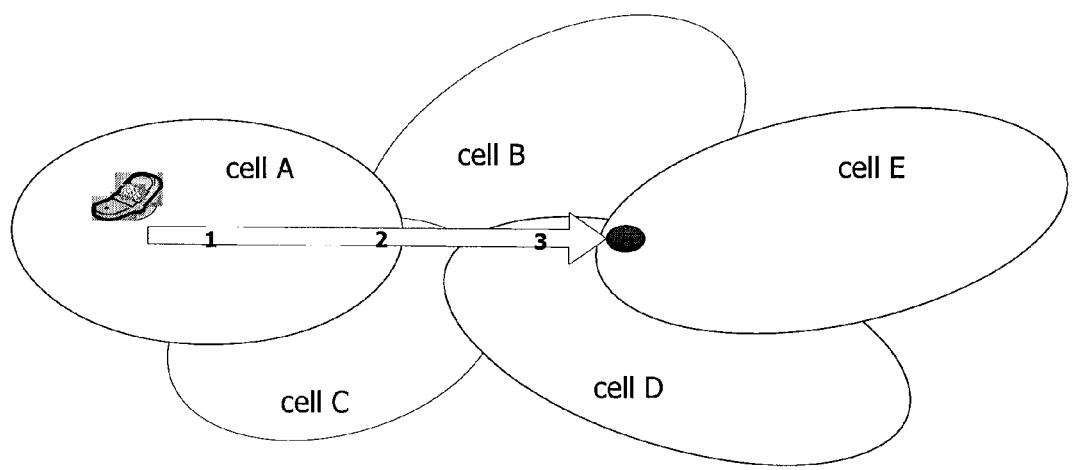
FIG. 9 is a chart showing a movement of a terminal in WCDMA according to another embodiment of the present invention.

FIG. 9 is a chart showing a movement of a terminal in WCDMA according to another embodiment of the present invention. Hereinafter, description of an exemplary embodiment in FIG. 9 will be given. Examples of elements provided in the system are as below.

all signal characteristic values measured by the terminal are RSRP values in dbm units.

a base station is positioned at a center of each cell, and a signal characteristic value received by the terminal decreases as a distance from the base station increases. The center of the base station has a high signal characteristic value of −60 dbm.

system information scaling factor with respect to the number of cell changes, {0~1:1.3, more than 2: 1} time restriction in cell re-selection (Treselection): 10 seconds signal characteristic values (Ssearch) of a serving cell which starts the measurement of the measurement cell: less than −100 dbm update period of a variation of the measurement cell: 20 seconds (i.e., one measurement cell set is generated in every 20 sec., and a variation is calculated from the latest two sets of measurement cell.)

minimum signal characteristic value for a cell to be selected: −180 dbm

Examples of a method for obtaining a scaling factor and rules for determining an update time by the terminal will be described.

a variation of the cells having a signal characteristic value greater than the minimum signal characteristic value (−180 dbm) for a cell to be selected among the measurement cells is calculated, and a variation of the cell having the same cell ID in the two sets of the measurement cell is not calculated. That is, the variation is calculated by sum of the number of the cells not having the same cell ID. For reference, the terminal discriminates the cells by information, such as a reference signal, code, frequency, bandwidth, radio access technology and the like.

scaling factor is updated based on the calculated variation and system information.

Scenario 1: If the terminal is camping on a position #1, the signal characteristic value (−60 dbm) of the serving cell A is greater than the threshold (Ssearch: −100 dbm), thereby not performing the measurement.

Scenario 2: While the terminal moves from the position #1 to a target area via a position #2, the terminal starts the measurement since the signal characteristic value of the serving cell A becomes below the Ssearch value (−100 dbm). The table below shows the two sets having an average of the signal characteristic values of the measurement cell before and after an update period (20 sec.) of the variation of the measurement cell.

| Measurement 1 | | Measurement 2 | |
| --- | --- | --- | --- |
| measurement cell | signal characteristic value | measurement cell | signal characteristic value |
| A | −110 dbm | A | −150 dbm |
| B | not detected | B | −170 dbm |
| C | not detected | C | −140 dbm | variation in cell numbers: according to the above rules, the cell A has a signal characteristic value greater than the minimum signal characteristic value for the cell to be selected in the two sets of the measurement cell, thereby being excluded from the calculation of the variation in numbers. The cell B has not been detected in the first set of the measurement cell, but satisfies the minimum signal characteristic value defined by the system in the second set of the measurement cell, thereby being applied to the calculation of the variation in numbers.

The cell C is applied to the calculation of the variation in numbers due to the same reason.

Since the variation in numbers for the two cells exists, the variation becomes 2.

A scaling factor corresponding to the variation 2 in the system information is 1, thereby not performing the Treselection update.

Scenario 3: The terminal is moving from the position #2 to the target area via a position #3, and the cell C is currently the serving cell. Since the signal characteristic value of the serving cell C is less than the Ssearch value (−100 dbm), the measurement continues to be performed. The table below shows two sets having an average of the signal characteristic values of the measurement cell before and after the update period (20 sec.) of the variation of the measurement cell.

| Measurement 1 | | Measurement 2 | |
| --- | --- | --- | --- |
| measurement cell | signal characteristic value | measurement cell | signal characteristic value |
| A | −170 dbm | A | not detected |
| B | −160 dbm | B | −120 dbm |
| C | −130 dbm | C | −190 dbm |
| D | not detected | D | −150 dbm |

According to the above rule, the cell A and the cell D have not been detected in one set of the measurement cell, but has a signal characteristic value greater than −180 dbm in another set of the measurement cell, thereby being applied to the calculation of the variation in numbers. In addition, for the cell C, the measurement cell 1 satisfies the signal characteristic value greater than −180 dbm. However, the measurement cell 2 is less than the minimum signal characteristic value (−180 dbm) defined by the system, thereby being considered as not being detected, thus to be applied to the calculation of the variation in numbers. The cell B has a value greater than −180 dbm in two sets of the measurement cell, thereby being excluded from the calculation of the variation in numbers.

As a result, the variation in numbers is 3, and the scaling factor corresponding to the variation 3 is 1. The Treselection* value becomes 10 sec. (=10×1) to be used in the cell re-selection, and the Treselection value is not updated.

Scenario 4: The terminal has been arrived at the target area, and the serving cell is currently the cell D. It is assumed that the terminal roams around the target area. Since the signal characteristic value of the serving cell D is less than the Ssearch value (−100 dbm), a measurement for searching for a cell having a good signal characteristic is performed. The table below shows two sets having an average of the signal characteristic values of the measurement cell before and after the update period (20 sec.) of the variation of the measurement cell.

| Measurement 1 | | Measurement 2 | |
| --- | --- | --- | --- |
| measurement cell | signal characteristic value | measurement cell | signal characteristic value |
| B | −140 dbm | B | −150 dbm |
| D | −130 dbm | D | −135 dbm |
| E | −160 dbm | E | −170 dbm |

According to the above rule, the cell B, the cell D and the cell E have values greater than the minimum signal characteristic value defined by the system in the two sets of the measurement cell, thereby being excluded from the calculation of the variation in numbers. Accordingly, the variation in numbers is 0, and the scaling factor corresponding to the variation value 0 is 1.3. The size of the Treselection* is 13 sec. (=10×1.3). That is, the time restriction in the stationary state becomes longer than the time restriction (10 sec.) of the basic cell re-selection received from the system. Accordingly, as the above example, if the terminal is positioned at the cell boundary, the time restriction for the cell re-selection is extended, thereby reducing the frequency of the cell re-selection which may frequently occur, thus to have an effect of reducing the service delay due to the cell re-selection.

In the related art, if the terminal is positioned at the cell boundary, the ping-pong situation causing several cells to be repeatedly selected has occurred due to a slight movement or a change of the radio access technology.

However, the method proposed in the present invention can uniformly maintain or extend the time restriction unless the radio circumstances greatly changes, thereby effectively preventing the ping-pong condition.

In the above process, cases of having a variation (e.g., the change in cell numbers) less than the threshold are counted, and if the count value exceeds a threshold, a method for determining the stationary state may be used, and a degree of multi-phased stationary state may be obtained by using a threshold with respect to different variations.

Figure 10:
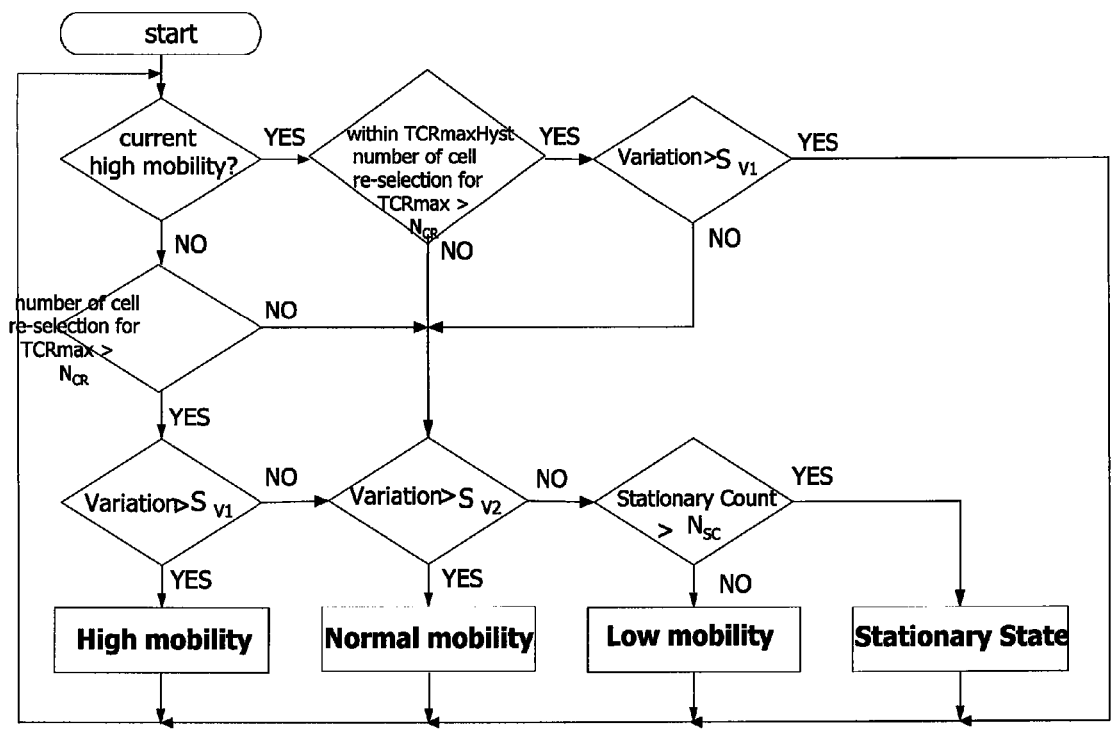
FIG. 10 is a flowchart showing an exemplary detection of terminal mobility using a variation together with a speed detection method in WCDMA.

The method for detecting the stationary state according to the present invention, together with the related art speed detection method by frequencies of the cell re-selection, may enable the speed detection by additionally applying the condition of the variation, examples of which are illustrated in FIG. 10.

In the related art WCDMA, if the frequency of the cell re-selection within the specific period of time (TCRmax) exceeds a certain frequency (NCR), the terminal considers (checks, recognizes) itself as a high mobility UE. In addition, by additionally applying the condition of the variation proposed in the present invention as shown in FIG. 10, it satisfies the condition to detect the related art high mobility. Further, if the variation exceeds the threshold (Sv1 or Sv2), the terminal considers itself as a high or normal mobility UE, thereby preventing an undesired mobility detection caused by the cell re-selection due to ping-pong condition occurring at the cell boundary. In addition, a state in which the terminal does not move (i.e., a state having a variation less than Sv1 or Sv2) is counted and if the count value is less than the specific value (NSC), the terminal considers itself as the low mobility, and if the count value is greater than the specific value (NSC), the terminal considers itself to be in the stationary state.

The method described so far may be implemented by software, hardware or their combination. For example, the method according to the present invention may be stored in a storage medium (e.g., an internal memory of a mobile terminal, a flash memory, a hard disk, or the like), and may be implemented by codes or command languages in a software program that can be executed by a processor (e.g., an internal microprocessor of a mobile terminal).

The present invention has been described with reference to the accompanying drawings, however, it is merely exemplary. For instance, the variation has been measured twice, however, it may be measured more than twice. In addition, the term 'variation' may also be referred to as 'deviation' and the technical scope of the present invention is not limited to the meaning of the term. Therefore, the term 'variation' may be replaced with a term indicating other measurement value. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. A method for selecting a cell by a mobile terminal in a mobile communication system comprised of a plurality of cells, the method comprising:
    determining that the mobile terminal is in a high mobility state;
    upon determining that the mobile terminal is in the high mobility state, determining that a predetermined event has occurred or that a timer has expired; and
    upon determining that the predetermined event has occurred or that the timer has expired, performing a cell re-selection process, the cell re-selection process including
        performing a first measurement at a first time period to identify a first set of cells having signal strengths over a predetermined threshold;
        performing a second measurement at a second time period to identify a second set of cells having signal strengths over the predetermined threshold;
        determining a variation between the first and second measurements, the determined variation being equal to a number of cells that are present in one but not both of the first and second sets divided by a total number of cells in both of the first and second sets;
        using the determined variation to determine that the mobile terminal has transitioned from the high mobility state to a substantially stationary state within the first and second sets of cells;
        if the mobile terminal is determined to have transitioned from the high mobility state to the substantially stationary state within the first and second sets of cells, determining a final cell re-selection time restriction by applying a first predetermined scale factor to a cell re-selection time restriction previously provided to the mobile terminal by a base station; and
        delaying an initiation of a subsequent cell re-selection process based on the final cell re-selection time restriction.

2. The method of claim 1, wherein the step of using the determined variation to determine that the mobile terminal has transitioned from the high mobility state to the substantially stationary state within the first and second sets of cells comprises:
    determining that the number of cells that are present in one but not both of the first and second sets is greater than a predetermined stationary count number.

3. The method of claim 1, further comprising:
    using the determined variation to determine that the mobile terminal has not transitioned from the high mobility state to the substantially stationary state within the first and second sets of cells but that the mobile terminal is in one of the high mobility state, a medium mobility state and a low mobility state within the first and second sets of cells;
    if the mobile terminal is determined to be in the one of the high mobility state, the medium mobility state and the low mobility state within the first and second sets of cells, determining another final cell re-selection time restriction by applying a second predetermined scale factor to the cell re-selection time restriction previously provided to the mobile terminal by the base station; and
    delaying the initiation of the subsequent cell re-selection process based on the another final cell re-selection time restriction.

4. The method of claim 3, wherein the predetermined threshold is one of a first threshold corresponding to the high mobility state and a second threshold corresponding to the medium mobility state.

5. A mobile terminal configured to select a cell in a mobile communication system comprised of a plurality of cells, comprising:
    a processor configured to
        determine that the mobile terminal is in a high mobility state,
        upon determining that the mobile terminal is in the high mobility state, determine that a predetermined event has occurred or that a timer has expired, and
        upon determining that the predetermined event has occurred or that the timer has expired, perform a cell re-selection process, the cell re-selection process including
            performing a first measurement at a first time period to identify a first set of cells having signal strengths over a predetermined threshold,
            performing a second measurement at a second time period to identify a second set of cells having signal strengths over the predetermined threshold,
            determining a variation between the first and second measurements, the determined variation being equal to a number of cells that are present in one but not both of the first and second sets divided by a total number of cells in both of the first and second sets,
            using the determined variation to determine that the mobile terminal has transitioned from the high mobility state to a substantially stationary state within the first and second sets of cells,
            if the mobile terminal is determined to have transitioned from the high mobility state to the substantially stationary state within the first and second sets of cells, determining a final cell re-selection time restriction by applying a first predetermined scale factor to a cell re-selection time restriction previously provided to the mobile terminal by a base station, and delaying an initiation of a subsequent cell re-selection process based on the final cell re-selection time restriction.

6. The mobile terminal of claim 5, wherein the processor is configured to use the determined variation to determine that the mobile terminal has transitioned from the high mobility state to the substantially stationary state within the first and second sets of by determining that the number of cells that are present in one but not both of the first and second sets is greater than a predetermined stationary count number.

7. The mobile terminal of claim 5, wherein the processor is further configured to use the determined variation to determine that the mobile terminal has not transitioned from the high mobility state to the substantially stationary state within the first and second sets of cells but that the mobile terminal is in one of the high mobility state, a medium mobility state and a low mobility state within the first and second sets of cells, if the mobile terminal is determined to be in the one of the high mobility state, the medium mobility state and the low mobility state within the first and second sets of cells, determine another final cell re-selection time restriction by applying a second predetermined scale factor to the cell re-selection time restriction previously provided to the mobile terminal by the base station, and delay the initiation of the subsequent cell re-selection process based on the another final cell re-selection time restriction.

8. The mobile terminal of claim 7, wherein the predetermined threshold is one of a first threshold corresponding to the high mobility state and a second threshold corresponding to the medium mobility state.

* * * * *